Dec. 15, 1942.   E. F. BRUNNER   2,304,776
FILLING A TIRE
Filed Dec. 18, 1940
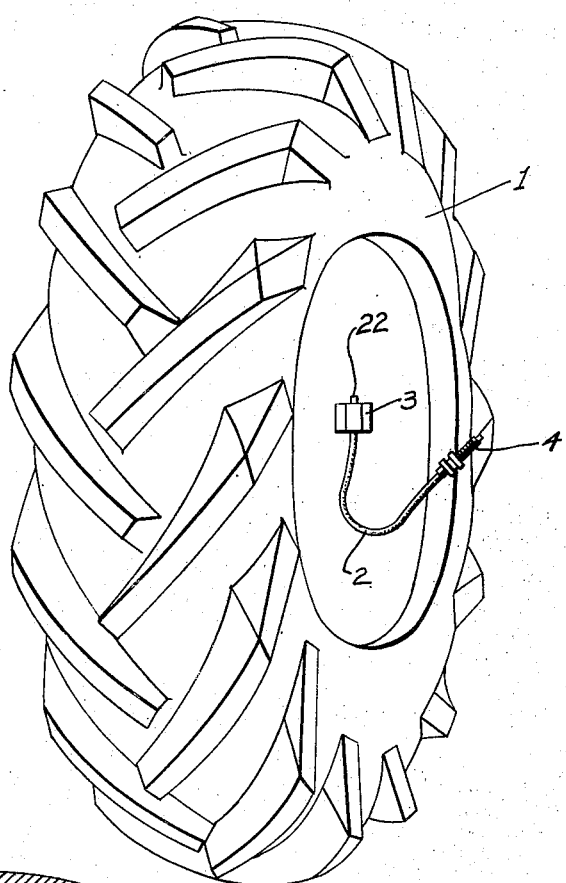
Fig. 1
Fig. 2
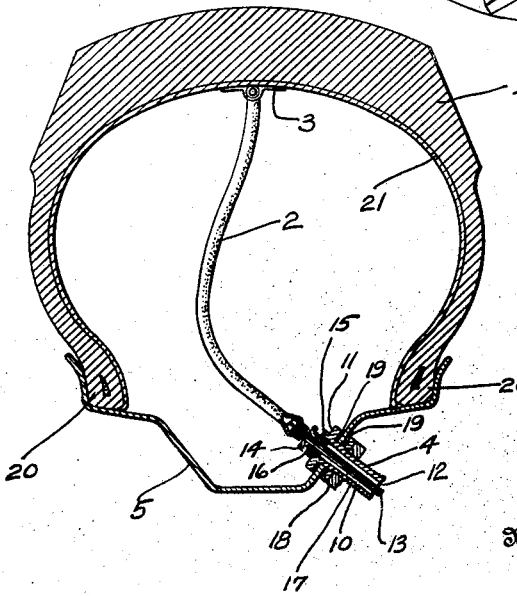
Fig. 3
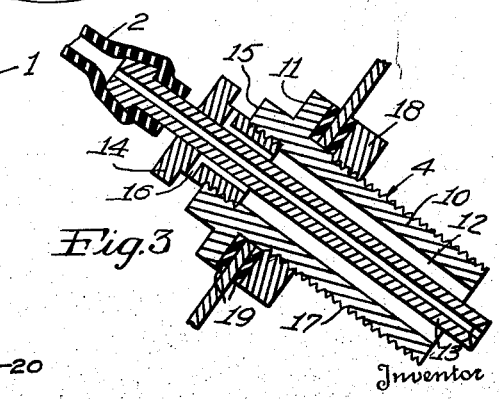
Inventor
Elmer F. Brunner
By
Attorney Patented Dec. 15, 1942

2,304,776

UNITED STATES PATENT OFFICE 2,304,776

FILLING TIRES

Elmer F. Brunner, Silver Lake, Ohio, assignor to Wingfoot Corporation, Wilmington, Del., a corporation of Delaware Application December 18, 1940, Serial No. 370,647

2 Claims. (Cl. 152—415)

This invention relates to filling a rubber tire, such as an implement or tractor tire with water. More particularly it relates to a tubeless tire provided with means for venting the air from the tire as it is filled with water.

It has recently been found that a tire which is completely filled with water, i. e., a tire from which all of the air has been removed and in which the air has been entirely replaced by water, has many advantages. Its use on tractors and implements, such as farm implements, etc., is particularly advantageous. It has further been found that a tire mounted on a rim without an inner tube will hold water as well as a tire which contains an inner tube. This invention relates to filling such a tubeless tire with water and more particularly to novel means for venting the air from the tire as it is being filled with water.

According to this invention, a rubber tube of small diameter is used for venting the air from the tire as it is filled with water. One end of the tube is fastened to the inside of the tire at a point opposite the middle of the tire tread. The other end of the tube is fastened to the valve or other air-venting means. Separate valves for the introduction of water and the escape of the air may be provided, although preferably both of these functions will be performed by a single valve of suitable design.

The invention will be further described in connection with the accompanying drawing, in which Fig. 1 is a view in perspective of a tire showing the air vent 2 fastened to the interior, and Fig. 2 is a section of a tire mounted on a rim with one end of the air vent fastened to the inside of the tire and the other end fastened to air escape means in the valve. The size of the valve is exaggerated in Fig. 2. Fig. 3 is an enlarged view of the valve.

The tire 1 shown in Fig. 1 is of the tractor or implement type as is evident from the heavy lugs which form a part of the tread. The tire is shown in perspective, and the air vent tube 2, which is a rubber tube of small diameter, is shown with one end fastened to the inner wall of the tire at a point opposite the middle of the tread. This end of the tube is fastened to the wall by the patch 3. This patch may be of adhesive-coated fabric, the adhesive of which adheres to both the rubber tube and the inner wall of the tire. A self-vulcanizing rubber adhesive may be used for this purpose. The patch is so placed on the tube as to not flatten the tube and obstruct the opening. The other end of the tube 2 is connected with a valve 4 which will be described in greater detail in connection with Fig. 2.

Fig. 2 is a section of the tire 1 mounted on the rim 5. One end of the rubber tube 2 is fastened to the interior of the tire by the patch 3, and the other end is connected with the valve 4. This valve 4 comprises a valve stem 10 with shoulders 11 formed on the inner end of it. This valve stem, of course, is hollow, and the water is introduced through the annular opening 12 around the vent pipe 13 through which the air escapes. The tube 2 is fastened to the inner end of this air vent. This inner end is provided with a nut 14 which is threaded into the inner end of the annular opening 12, and between the head of the nut 14 and the shoulder 15 there are openings 16 through which the water passes in going from the annular passageway 12 into the interior of the tire.

The stem 10 of the valve is threaded externally, as shown at 17. The valve is so designed that it is passed through the hole provided for it in the rim from the inside of the tire. It is held in place by the nut 18 which screws onto the threads 17. The gaskets 19 provide a tight seal and prevent the escape of water.

It is difficult to seat a tubeless tire on the rim. The rim 5 of Fig. 2 is a drop-center rim. The tire is placed over the rim in the usual way. It has been found most advantageous to place one of the beads 20 of the tire in place on the seat provided for it on the rim and then push the valve through the opening provided in the rim, fasten it in place on the rim, and then bring the other bead into place on the opposite side of the rim. In order to force the beads apart onto the seats provided on the rim, it has been found advantageous to place a chain or belt around the center of the tread and to contract this chain or belt to shorten the circumference of the tread of the tire and thus force the beads apart.

This practice has been used to advantage to bring the two beads into contact with the rim on opposite sides of the drop-center. When the beads make contact with the rim at this point, air is introduced into the tire and by building up a sufficient air pressure the beads are forced back into place. It may be necessary to pound the tire some to cause the beads to slip into place. When the beads have made sufficiently tight contact with the rim to hold air under pressure, the chain or belt which has been tightened around the tread is loosened and removed. It has served its purpose.

Once the beads 20 have been gotten into the proper places on the rim, the air pressure may be reduced, and water is then introduced into the tire instead of air. The joint between the tire beads and the rim is not water-tight until after the beads are properly seated. It has been found advantageous to coat the inner wall of the tire with a relatively pure gum coating 21 to make it water-tight.

The end 22 of the vent tube should be at the highest point in the inside contour of the tire as the tire is being filled with water in order to remove all of the air. The patch should be opposite the middle of the tread, and the tire should be so marked that the position of the patch 3 is known so that the patch may be brought to the high point of the tire after the tire is mounted on the rim. Then as the tire is filled with water, the air, including the last traces, is vented through the rubber tube 2 and out through the air stem 13 of the valve. After all of the air has been replaced, water will squirt through this pipe 13. It is then known that the tire is completely filled with water. The vent 13 is then closed and by the introduction of more water any desired water pressure may be built up within the tire.

The valve shown is not complete. It is shown on a somewhat enlarged scale in Fig. 2. The threads 17 are provided for screwing a suitable adapter over the outer part of the valve shown in Fig. 2. This adapter is preferably provided to supply either air or water through the annular opening 12. Air is supplied until the beads have been seated, and then water is supplied through this opening. The adapter should so cooperate with the air vent 13, that this vent is closed while air is being blown into the tire in order to build up an air pressure within the tire in order to facilitate the seating of the beads on the rim. The adapter should provide for venting air through the air vent 13 when the tire is being filled with water, and valve means should be provided for closing the vent 13 when the adapter is removed. Means for closing the vent 13 and the annular opening 12 should be provided.

Although the improvement has been described in connection with a tractor or implement tire, it is to be understood that it may easily be adapted to other rubber tires, including bus and passenger tires. Although a rubber tube has been shown, any other flexible water-tight tubing may be employed for venting the air. Any suitable valve means for venting the air may be employed, and the same valve means or separate means may be used for introducing water into the tire.

What I claim is:

1. In combination, a drop center rim, an open-beaded pneumatic tire mounted on the rim, a small-bore flexible rubber tube of considerably greater length than the radial distance from the inside of the tread of the tire to the rim, a patch securing one end of the tube to the inside of the tread of the tire so that the end of the tube is open, a metal valve stem secured to the other end of the tube and removably secured in sealing relation in the valve stem hole in the rim, said valve stem including a passage for air connected to the tube and a passage for liquid connected to the inside of the tire adjacent the valve stem.

2. In combination, a rim, an open-beaded pneumatic tire mounted on the rim, a flexible rubber tube of considerably greater length than the radial distance from the inside of the tread of the tire to the rim, means securing one end of the tube to the inside of the tread of the tire so that the end of the tube is open, a metal valve stem secured to the other end of the tube and secured in sealing relation in the valve stem hole in the rim, said valve stem including a passage for air connected to the tube and a passage for liquid connected to the inside of the tire adjacent the valve stem.

ELMER F. BRUNNER.